*G. A. Douglas,*
*Faucet.*
*No. 109,191.* *Patented Nov. 15, 1870.*
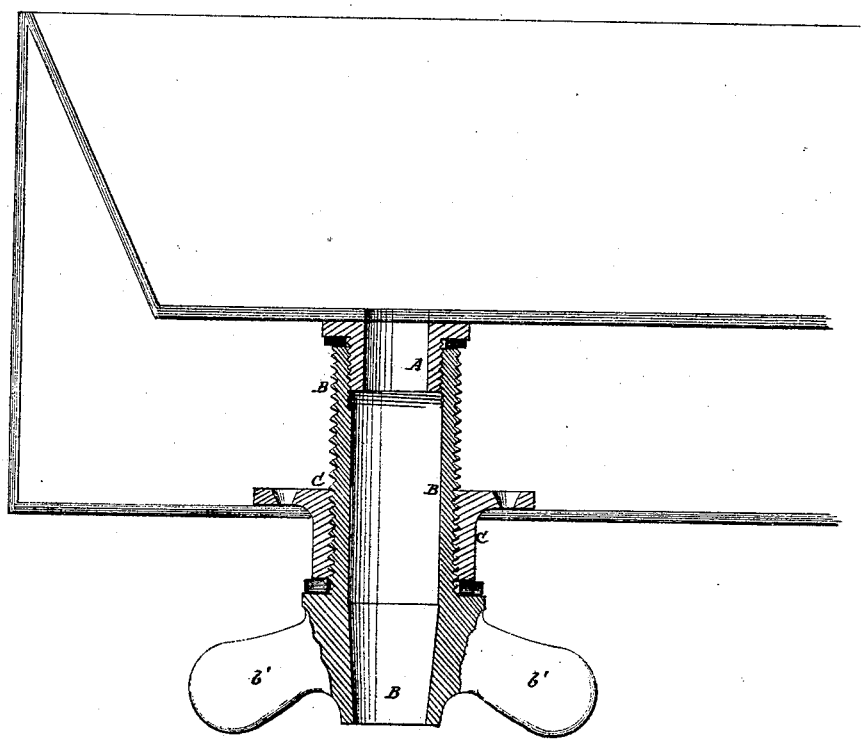
Witnesses:
Inventor:
G. A. Douglas
per
Attorneys.

UNITED STATES PATENT OFFICE.

CHARLES A. DOUGLAS, OF FRANKLIN, NEW YORK.

IMPROVEMENT IN FAUCETS.

Specification forming part of Letters Patent No. 109,191, dated November 15, 1870.

*To all whom it may concern:*

Be it known that I, CHARLES A. DOUGLAS, of Franklin, in the county of Delaware and State of New York, have invented a new and useful Improvement in Faucets; and I do hereby declare that the following is a full, clear, and exact description thereof, which will enable others skilled in the art to make and use the same, reference being had to the accompanying drawing, forming part of this specification, in which the figure is a detail longitudinal section of my improved faucet.

My invention has for its object to furnish an improved faucet for drawing off liquids from vats or other vessels, placed one within the other, and which shall be so constructed that the liquid may be drawn from either vessel, as may be desired; and it consists in the construction and combination of the various parts of the faucet, as hereinafter more fully described.

I will describe the faucet as attached to the milk and water chambers of a milk-cooling vat, although it is equally applicable to various other kinds of vessels.

A is a short tube, having a flange formed around its upper end, by means of which it may be soldered or otherwise attached to the bottom of the milk-tank. Upon the outer surface of the tube A is cut a screw-thread to receive the screw-thread cut upon the interior surface of the forward end of the hollow or tubular screw B. The upper end of the tube A may be closed by a cork, screw, plug, or other reliable and readily-detachable stopper.

C is a short tube, having a flange formed around its upper end, by means of which it is secured to the bottom of the water-chamber. The tube C has a screw-thread cut in its interior surface to receive the screw-thread cut upon the outer surface of the tubular screw B.

The lower end of the tubular screw B may be closed by a cork, screw-plug, stop-cock, or other convenient stopper. Upon the lower end of the screw B is formed a cross-head, $b'$, or other handle, for convenience in operating it.

Leather or other suitable washers may be placed upon the tube A for the end of the tubular screw B to press against, and upon the tubular screw B for the end of the tube C to press against, to serve as packing to make the joints between the said parts A B C wholly water-tight.

By this construction, when it is desired to draw off the liquid from the inner vessel, the tubular screw B is screwed up into the position shown in the drawing. The stoppers are then removed from the upper end of the tube A and from the lower end of the tubular screw B, allowing the liquid in the inner vessel to flow off.

When it is desired to draw off the liquid from the outer vessel the tubular screw B is turned down until its upper end is flush with or a little below the bottom of said outer vessel. The stopper is then removed from the lower end of the said tubular screw B, allowing the liquid in the outer vessel to flow off freely.

Having thus described my invention, I claim as new and desire to secure by Letters Patent—

The improved faucet A B C, the said parts A B C being constructed and operating substantially as herein shown and described, and for the purpose set forth.

The above specification of my invention signed by me this 13th day of September, 1870.

CHARLES A. DOUGLAS.

Witnesses:
JAMES T. GRAHAM,
T. B. MOSHER.